UNITED STATES PATENT OFFICE.

LEOPOLD SCHERZER, OF VIENNA, AUSTRIA-HUNGARY.

PROCESS FOR PRODUCING SPARKLING WINES FROM GRAPES.

No. 853,037. Specification of Letters Patent. Patented May 7, 1907.

Application filed February 25, 1903. Serial No. 145,083.

*To all whom it may concern:*

Be it known that I, LEOPOLD SCHERZER, a citizen of the Empire of Austria-Hungary, residing in Vienna, Austria-Hungary, have invented certain new and useful Improvements in the Processes for Producing Sparkling Wine from Grapes; and I do hereby declare the following to be a full, clear, and exact description of the invention, such as will enable others skilled in the art to which it appertains to make and use the same.

My invention has for its object an improved process for producing sparkling wine from grapes.

This process essentially consists in employing grapes which have been stored after cutting, for some time at a certain temperature in order to allow them to ripen thoroughly to a point where decay sets in, and in utilizing for the juice pressed therefrom, the carbonic acid, which has escaped from the juice during the process of fermentation.

According to my invention the freshly gathered grapes are placed upon stretched cloths and stored in rooms protected against draft, where they are left subjected to a constant temperature of from 40° to 44° centigrade until the decay just starts in. This first step of the process is novel and is the most important, for it is well known, that the grapes, when they are gathered as ripe as possible, have nevertheless a number of berries which should have been exposed to the sun for several days longer, before their contents of sugar come to the same standard as the sugar in the other berries.

I have found that by keeping the grapes for several days at a temperature from 40° to 44° C. the ripening of the less advanced berries can be effected without loss to the berries already fully ripe. Of course the grapes should not be subjected to said temperature longer than necessary and when the overripe berries commence to decay, the grapes must be removed for further treatment. A temperature of about 40° C. is not sufficient to produce desiccation and the grapes lose very little of their juice by this treatment. They are then mashed, pressed, and the juice obtained is left to ferment in the usual manner in barrels or vats. These vessels are closed except as to the openings by means of which they are connected to an air pump, which draws off the carbonic acid escaping during the fermentation, and conveys it into storage reservoirs for future use The process of fermentation being finished, the wine is passed through suitable filters and subsequently subjected to a process of sterilization, care being taken, that its temperature does not surpass 87° C.—The wine having been sterilized, it is stored in barrels for about from 6 to 8 weeks. After having been filtered again, the wine is now ready to be prepared for bottling. It is injected in the well known manner into a mixing apparatus into which is introduced the carbonic acid collected during the fermentation.

By means of a suitable bottling apparatus the wine saturated with carbonic acid is filled into bottles which are then corked and wired.

The sparkling wine thus produced is of excellent quality and taste as well with regard to strength as also to keeping.

The advantage which the described process offers is that by allowing the grapes to become very ripe a wine of uniform quality is obtained even from grapes containing comparatively different degrees of sugar, owing to the circumstance that by this treatment a comparatively high percentage of non-fermentable matter is transformed into grape sugar.

By employing for saturating the wine with carbonic acid, the gas, which escapes from the juice during the process of fermentation, the taste of the sparkling wine is considerably improved, and the admixture of foreign substances contained in the ordinary compressed carbonic acid of commerce is avoided.

Having thus described my invention what I claim is:

The improved process for producing sparkling wine which consists in exposing the grapes to a temperature of 40°—44° C. till decay commences, in pressing the grapes, then fermenting the juice in vessels closed except as to the openings through which the carbonic acid gas is collected, collecting the carbonic acid escaping therefrom, and finally in employing the carbonic acid which has escaped from the juice during the process of fermentation for producing the sparkling wine proper.

In testimony whereof he affixes his signature.

LEOPOLD SCHERZER.

In the presence of—
FRIEDRICH BINDER,
ALVESTO S. HOGUE.